US008681001B2

(12) United States Patent
Griesmann et al.

(10) Patent No.: US 8,681,001 B2
(45) Date of Patent: Mar. 25, 2014

(54) METHOD AND APPARATUS FOR OPTIMIZING READER POWER CONSUMPTION BY VARYING POLL PARAMETERS IN AN AUTOMATED INVENTORY TRACKING SYSTEM

(75) Inventors: Daniel S. Griesmann, Villa Park, IL (US); Randy L. Ekl, Lake Zurich, IL (US); Binit Jain, Schaumburg, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 261 days.

(21) Appl. No.: 13/281,982

(22) Filed: Oct. 26, 2011

(65) Prior Publication Data

US 2013/0106608 A1    May 2, 2013

(51) Int. Cl.
*G08B 13/14*    (2006.01)
*H04Q 5/22*    (2006.01)

(52) U.S. Cl.
USPC ....... 340/572.1; 340/10.1; 340/5.92; 235/385

(58) Field of Classification Search
USPC .................. 340/10.1, 10.2, 10.3, 10.33, 5.92, 340/572.1, 10.34, 572.4; 235/492, 375, 235/376, 385, 435, 436
See application file for complete search history.

(56) References Cited

U.S. PATENT DOCUMENTS

| | | | | |
|---|---|---|---|---|
| 8,004,387 B2 * | 8/2011 | Childress et al. | ............ | 340/5.92 |
| 8,228,173 B2 * | 7/2012 | Missimer et al. | ............ | 340/10.2 |
| 2008/0174404 A1 * | 7/2008 | Gopalan et al. | ............ | 340/10.1 |
| 2008/0191843 A1 | 8/2008 | Strzelczyk | | |
| 2009/0079571 A1 | 3/2009 | Calvarese | | |
| 2010/0156597 A1 | 6/2010 | Stern et al. | | |
| 2011/0025462 A1 | 2/2011 | Stern et al. | | |
| 2012/0161967 A1 | 6/2012 | Stern et al. | | |

OTHER PUBLICATIONS

PCT International Search Report Dated May 15, 2013 for Counterpart Application PCT/US2012/059499.

* cited by examiner

*Primary Examiner* — Anh V La
(74) *Attorney, Agent, or Firm* — Kenneth A. Haas; Terri H. Smith

(57) ABSTRACT

Polling operations performed by a reader may be adjusted by a server. The server determines at least one of volatility measurements or polling operation parameters based on information obtained from components within an automated inventory tracking system. The automated inventory tracking system is part of an inventory management system. The server also obtains volatility measurements from another system within the inventory management system. The server incorporates the volatility measurements obtained from the other system, at least one of the volatility measurements or the polling operation parameters determined by the server, and power usage information associated with the reader into a periodic calculation to determine optimal polling parameters. The server periodically sends the optimal polling parameters to the reader for adjustment to a polling operation performed by the reader within a coverage area.

16 Claims, 6 Drawing Sheets

METHOD AND APPARATUS FOR OPTIMIZING READER POWER CONSUMPTION BY VARYING POLL PARAMETERS IN AN AUTOMATED INVENTORY TRACKING SYSTEM

FIELD OF THE DISCLOSURE

The present disclosure relates generally to power consumption in Radio Frequency Identification (RFID) readers and more particularly to optimizing power consumption in RFID readers based on information obtained from separate systems within an inventory management system.

BACKGROUND

Radio Frequency Identification (RFID) systems have become increasingly prevalent and can be used to identify people as well as objects. An RFID system may be configured to include at least one RFID reader (also referred to herein as reader) and one or more RFID tags (also referred to herein as tags). The RFID reader transmits radio frequency (RF) signals and receives RF signals from one or more tags within a certain range. It should be noted that actual coverage areas within which readers transmit and receive RF signals are often not uniform and depend on many factors, including but not limited to, an antenna configuration of each reader, the RF characteristics of the area around the reader (e.g. empty space vs. metal obstructions), or the transmit power of each reader. RFID tags are typically compact and are attachable to objects.

RFID tags are configured to include an integrated circuit for storing and processing information, modulating and demodulating RF signals, and performing other specialized functions. RFID tags may include an antenna in communication with the integrated circuit, wherein the antenna is used for transmitting RF signals to and receiving RF signals from the RFID reader. An RFID tag is usually tuned to a particular frequency band.

In some implementations, RFID systems are deployed as part of an inventory management system. To maintain an accurate, up-to-date inventory of items for sale, as part of the inventory management system, retail establishments may deploy separate interconnected systems, such as an automated inventory tracking system for tracking the presence and locations of items in the establishment and a point of sale system for monitoring which items are sold. The presence and locations of items in the establishment may be tracked by affixing an RFID tag on each item for which automated inventory tracking is desired. The automated inventory tracking system may include RFID readers powered with relatively small batteries. These readers may be distributed throughout the establishment to provide RF coverage for areas where tagged items may be located. Each reader periodically polls or interrogates the RFID tags within its coverage area, i.e. each reader sends RF signals to and receives RF signals from tags within its coverage area. After polling the tags for a predefined length of time (interrogation length), the readers may send a list of read or retrieved tag identifiers (IDs) to a single central server via, for example, Wireless Fidelity (Wi-Fi). Based on data aggregated from one or more polls and/or from one or more readers, the server may maintain key measurements for items in the inventory. For example, the server may maintain measurements about which items are present at a predefined location in the establishment. The server is capable of directing polling intervals, i.e. directing how long each reader in the establishment is to wait before performing a subsequent poll.

Allowing all readers in the establishment to conduct frequent polls provides for timely notifications of changes for items being tracked. For example, when all readers in the establishment conduct frequent polls, the server is able to quickly identify when a tracked tagged item has been moved from one location to another. The server may also increase the interrogation length (the length of time the reader can send RF signals to and receive RF signals from tags) or increase the reader's transmit power in an attempt to receive RF signals from more tags. However, when the server instructs the reader to conduct frequent polls, increase the interrogation length and/or increase its transmit power, the reader also increases usage of its battery power.

To minimize consumption of the reader's battery power, one approach allows for power savings by shutting off the readers during times when the establishment is closed. Using this approach, the reader may be manually or automatically shut down when the establishment is closed to minimize battery power consumption. However, this approach does not provide an avenue for minimizing battery power consumption while the establishment is open and the system is expected to produce useable results.

Another approach to minimizing battery power consumption reduces wired or wireless reader to server communications. In this approach, only the difference between results of a most recent poll and a poll immediately prior to the most recent poll is sent from the reader to the server. It is noted, however, that communications between the reader and tags use a larger portion of the reader's total battery power than the communications between the reader and the server. Therefore, reduction of wired or wireless reader to server communications minimally affects the overall battery power consumption.

Another approach allows for minimizing the battery power consumption by measuring inventory change or volatility within the automated inventory tracking system and making adjustments to polling parameters, such as the polling frequency or interrogation length, based upon the measurements. It is noted, however, that this approach does not take into account inventory change or volatility measurements made by other systems, such as point of sale systems, within the broader inventory management system.

Accordingly, a method is needed for optimizing power consumption in the RFID radio by adjusting polling parameters based on information obtained from separate systems within the inventory management system.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
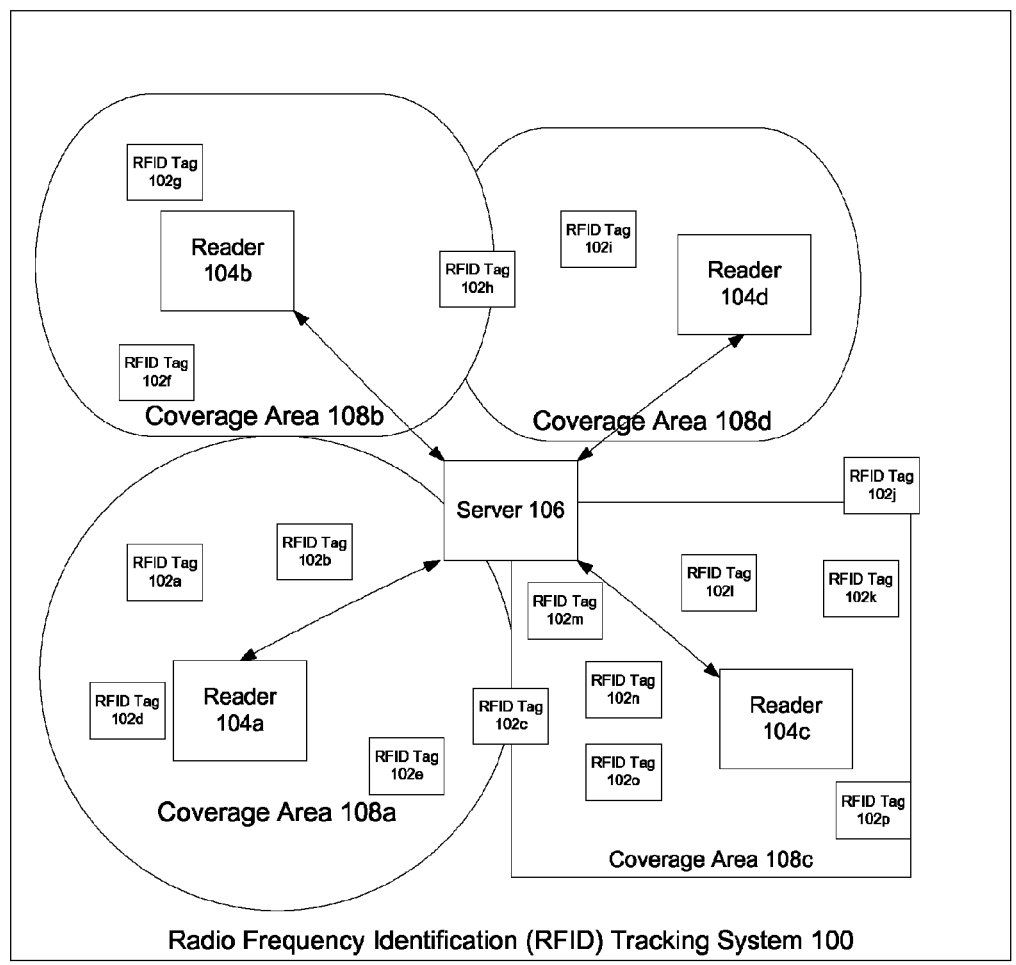
FIG. 1 is a block diagram of a Radio Frequency Identification (RFID) automated inventory tracking system used in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Some embodiments are directed to methods and apparatuses of adjusting polling operations performed by a reader. A server determines at least one of volatility measurements or polling operation parameters based on information obtained from components within an automated inventory tracking system. The automated inventory tracking system is part of an inventory management system. The server also obtains volatility measurements from another system within the inventory management system. The server incorporates the volatility measurements obtained from the other system, at least one of the volatility measurements or the polling operation parameters determined by the server, and power usage information associated with the reader into a periodic calculation to determine optimal polling parameters. The server periodically sends the optimal polling parameters to the reader for adjustment to a polling operation performed by the reader within a coverage area. The polling operation parameters may include input for determining reader specific polling attributes including a reader transmit power or a reader interrogation length.

FIG. 1 is a block diagram of a Radio Frequency Identification (RFID) tracking system used in accordance with some embodiments. RFID system 100 includes RFID readers 104 (also referred to herein as readers 104), each of which transmits radio frequency (RF) signals and receives RF signals from one or more tags within a coverage area. As noted previously, actual coverage areas 108 of RFID readers 104 are not uniform and depend on many factors. For example, coverage areas for readers 104 may depend on the antenna configuration of each reader, the RF characteristics of the area around each reader (e.g. empty space vs. metal obstructions), the transmit power of each reader or the interrogation length of each reader. Readers 104 may operate independently or may be coupled together to form a reader network.

Each reader 104 communicates with one or more RFID tags 102 (also referred to herein as tags 102), within its coverage area. RFID tags 102 can be affixed or attached to one or more items in order to determine an inventory of items within an establishment. Each reader 104 may interrogate RFID tags 102 within its coverage area 108 by transmitting an interrogation signal to the RFID tags within the reader's coverage area. RFID tags 102 within the reader's coverage area may transmit one or more response signals to the reader in a variety of ways, including by alternatively reflecting and absorbing portions of the interrogation signal according to a time-based pattern or frequency. The period during which the interrogation signal and the response signals are sent between reader 104 and tags 102 is referred to herein as a interrogation period.

Each RFID tag 102 conveys identifying information, for example a number associated with an item, wherein the identifying information is used in conjunction with other information stored in the automated inventory tracking system to identify an individual item or type of item to which the tag is attached or affixed so that an inventory determination can be quickly accomplished through RFID interrogation. It should be noted that RFID tags 102 may be affixed or attached to individual items or to a group of items. For example, a tag may be affixed or attached to one or more pallets with multiple items. In an embodiment, item(s) to be associated with a location or region may be attached to a RFID tag 102 which transmits identifying information about the item(s) to which the RFID tag is affixed or associated. RFID tags 102 can therefore provide information sufficient to be used in determining the types of items and the number of items present within the establishment so that different types of tag-to-location associations can be performed.

After receiving response signals from tags 102, readers 104 transmit data obtained from tags 102 to a central server 106. Server 106 may use data aggregated from multiple of interrogation sessions between a specific reader and the associated tags 102 and/or data aggregated from multiple readers 104 to determine polling parameters to be used for optimizing polling with system 100. Server 106 is configured to provide parameters to the readers on how to communicate with tags 102. For example, server 106 may direct polling intervals used by readers 104 within system 100, i.e. server 106 may direct how long each reader 104 is to wait before performing a subsequent poll of tags 102 within its coverage area.

Figure 2:
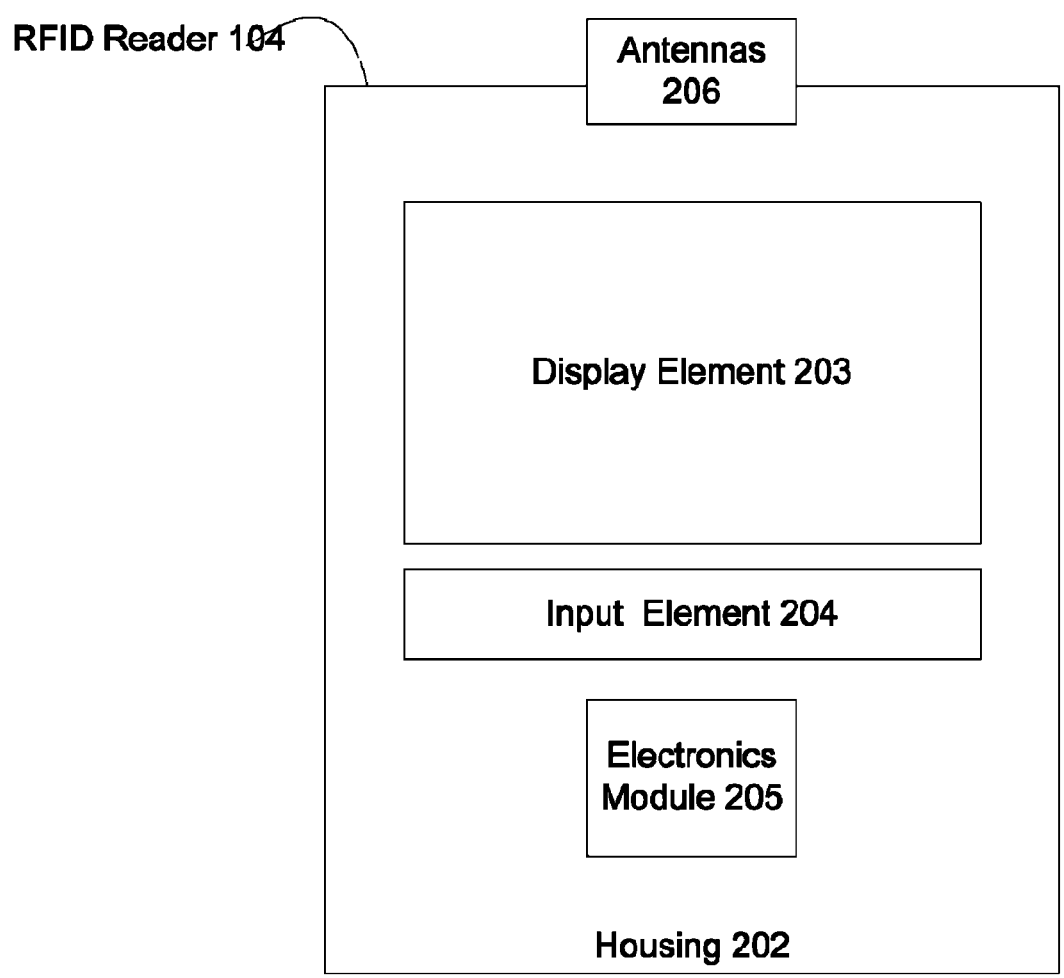
FIG. 2 is a block diagram of a RFID reader used in accordance with some embodiments.

FIG. 2 is a block diagram of a RFID reader used in accordance with some embodiments. RFID reader 104 generally includes a housing 202, a display element 203 that is visible from the outside of the housing 202, an input element 204 that is accessible from the outside of the housing 202, an electronics module 205 contained within the housing 202, and one or more RFID antenna 206 (which can be, but is not necessarily, contained within the housing 202). Input element 204 may be a keypad, a touch panel or other input/output elements. The display element 203 and input element 204 function as input/output elements during use of reader 104. Display element 203 and input element 204 can be coupled to electronics module 205 as necessary to support input/output functions in a conventional manner. Electronics module 205 may incorporate hardware components and software functionality of RFID reader 104. In some embodiments, electronics module 205 can be physically realized as an integrated component, board, card, or package mounted within the housing 202. Electronics module 205 may include one or more memory portions for storing instructions, wherein one or more of the memory portions are coupled to one or more processors for performing functions associated with RFID reader 104. Electronics module 205 can be coupled to the RFID antenna 206 using suitable techniques. For example, the electronics module 205 and the RFID antenna 206 can be connected via an RF cable and RF connector assemblies.

Figure 3:
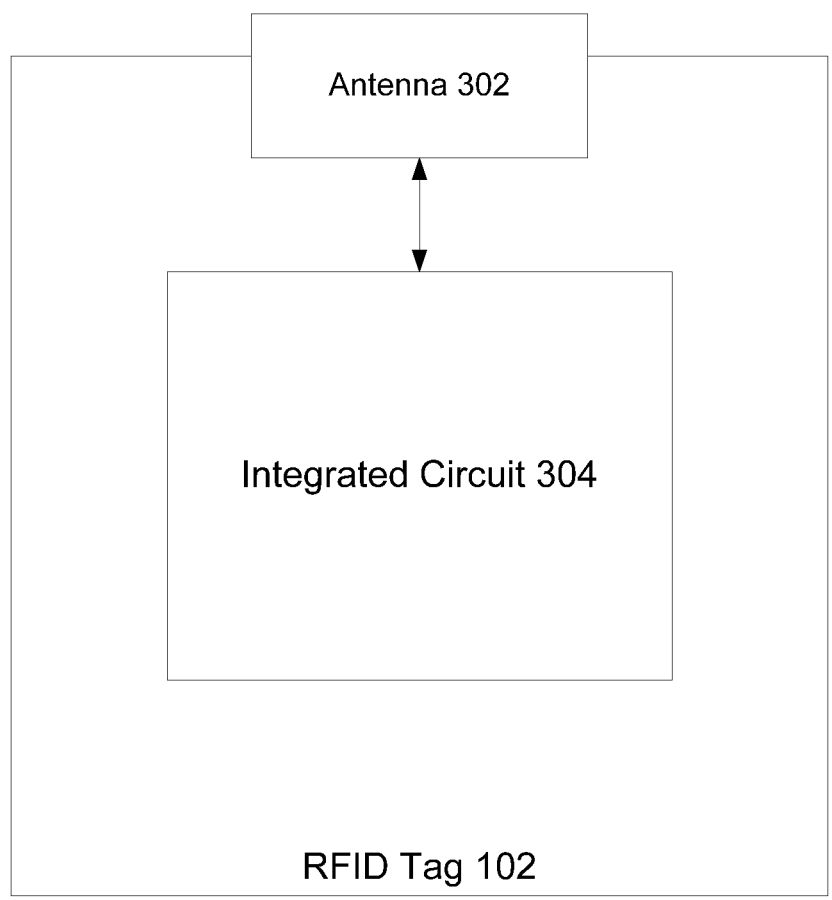
FIG. 3 is a block diagram of a RFID tag used in accordance with some embodiments.

FIG. 3 is a block diagram of a RFID tag used in accordance with some embodiments. RFID tag 102 includes an antenna 302 and an integrated circuit 304. Antenna 302 is configured to receive and transmit RF signals. Integrated circuit 304 is configured to store and process information. RFID tag 102 can be positioned within transmission range of the RFID reader 104. Accordingly, RFID tag 102 can receive an interrogation signal sent from RFID reader 104 with antenna 302.

Integrated circuit 304 can perform one or more operations in response to receiving the interrogation signal, including modulating the interrogation signal. After processing the interrogation signal, RFID tag 102 can transmit a response signal to RFID reader 104 through antenna 302. Upon receipt of the response signal, RFID reader 104 may extract information from the response signal and transmit the extracted information to the central server.

Returning to FIG. 1, embodiments are directed to adjusting the polling parameters used by each reader 104 during retrieval of updated data from tags 102 within the reader's coverage area at a frequency commensurate with a current level of volatility within the establishment while optimizing consumption of the reader's battery power. Volatility measurements include, for example, measuring changes associated with movements of items being tracked, including measuring introduction to and/or removal of tracked items and/or changes in the locations of tracked items. Location volatility can be observed via, for example, changes in the set of readers reading a tracked tag or via, for example, changes over time to poll responses of a single reader. For example, attributes of positive poll responses or no poll responses obtained from the reader can be used in determining location volatility. An example of using attributes of positive poll response would be if the average number of antennas on a single reader receiving responses from a tag changes significantly over time, this may be an indication that the item's position or orientation has changed, though such a change might not cause the set of readers reading the tag to change. There is typically a positive correlation between different aspects of volatility. For example, when an item is sold frequently, there is a likelihood that customers may also move the item to other locations within the establishment. Therefore, measurements of one aspect (e.g. sales) can be used to make predictions about volatility in general.

Hence, server 106 may incorporate volatility measurements associated with tagged items and battery utilization data into periodic calculations to determine optimal polling parameters. It should be noted that periodic calculations may be performed during fixed or variable intervals. The periodic calculations are sent from server 106 to reader 104 to be used by readers 104 in adjusting the polling operation of each reader 104 until receipt of the next calculation. For example, when an establishment is closed and volatility is zero, the poll frequency of each reader 104 can be adjusted so that polls are conducted at a frequency of, for example, one poll every several hours, thereby using a relatively small percentage of the reader's battery power. On the other hand, during busy hours, items are moved around the establishment and sold. Hence, the poll frequency of each reader 104 can be adjusted so that polls are conducted more frequently to ensure that up to date information about the locations of tracked items are available. Polling information can be managed at various levels (e.g. system-wide, department or location, or a reader level) using volatility information of the corresponding scope.

In one embodiment, input may be obtained from another system/component of the broader inventory management system, for example, a sales system, such as a point-of-sale (PoS) system, or another system which provides information whenever an item is sold or added to the inventory. In some cases, when the server obtains input from the sales system that indicates when a tagged item is removed from or added to the inventory, the server may be unable to determine the precise position on the sales floor that the item was added to or removed from. In these cases, the input obtained from the sales system can be used by the server to manage polling operations at a store-wide or department level. In other cases, even if the sales system does not provide location information for items added or sold, the automated inventory management system itself may be able to track locations of items by, for example, making predictions about location. In these cases, the automated inventory management system could take a tag identifier of an added or removed item from the sales system and combine the tag identifier with a predicted location for the item in order to manage the reader's polling. Hence, in cases where the input obtained from the sales system does not include information regarding the locations of items within the establishment, the server can use volatility data obtained from the input for management of polling at the reader level.

In some embodiments, server 106 may also obtain input from inventory information accessible to server 106 through the automated inventory tracking system. Server 106 may obtain the input over a period of time to gauge volatility. Server 106 may use the automated inventory tracking system input to make periodic estimations of presence and locations of items. Server 106 may manage and adjust polling at various levels (for example, at a department level or an individual reader level) based on the periodic estimations of presence and locations of items.

Upon obtaining volatility information and input from other systems in the inventory management system, server 106 may use a function to calculate the measured volatility and to map the measured volatility to an appropriate polling operation, for example, polling frequency. This function can be, for example, a lookup in a static table or a complex calculation designed to achieve a desired future volatility per poll based on measured volatility. For example, if a calculation finds 0.1% volatility per poll and 0.2% per poll is target volatility per poll, server 106 could use the function to determine that the poll frequency should be cut in half.

To prevent continuously volatile inventory from using excessive battery power, an upper limit can be selected for certain polling operations, such as the polling frequencies. For example, a fixed upper limit ($f_{max}$) may be chosen to guarantee a certain battery life in cases where the poll frequency remains at $f_{max}$ for the entire life of the battery. In some embodiments, a target battery level per unit time may also be set, wherein the poll frequency is permitted to increase only to the point that the battery level will continue to remain at or below a target level until the next time the poll frequency is calculated. This allows for a reader 104 that is using less than its battery budget at a particular time to temporarily increase its polling frequency beyond $f_{max}$ when necessary to keep up with volatile inventory.

Server 106 may also obtain periodic battery level reports from each reader 104. This permits tracking of actual battery levels for comparison with current and future target battery levels. Alternatively, server 106 could estimate each reader's remaining battery if it is provided with initial battery energy levels and if it has knowledge of how much battery power each reader operation consumes. Because server 106 knows the numbers and characteristics of the poll operations each reader performs, server 106 could estimate each reader's remaining battery. However, estimating each reader's remaining battery may be a less accurate way of estimating polling operations because the estimations typically cannot account for factors such as the variable efficiencies of different batteries.

In an embodiment, server 106 could calculate parameters for controlling polling operations, such as poll frequencies at specific locations within the establishment, the interrogation length of each reader, the transmit power of each reader, or the number of antennas to be used by each reader during polling.

In addition, server 106 could calculate parameters, such as a target battery usage rate, a target battery level function, a poll frequency to battery usage rate function, a battery usage rate to poll frequency function, a calculated poll frequency function, volatility, and new poll frequency. Server 106 can determine polling parameters based on information obtained from other systems within the broader inventory management system and/or information obtained from the automated inventory tracking system, including information obtained from the readers.

Consider the following example where various polling parameters are calculated. In this example, if a reader battery should last t hours, where t is, for example 100, and the reader battery contains e units of energy at hour zero (0), where e is, for example, 1000 at hour 0, server 106 may calculate the target battery usage rate (tgt_battery_usage_rate) as being equal to e divided by t, i.e. tgt_battery_usage_rate=1000/100=10 energy units per hour. Server 106 may calculate the target battery level function (tgt_battery_lvl( )) at hour n as being equal to e minus the product of the tgt_battery_usage_rate multiplied by n energy units, i.e. tgt_battery_lvl( )hour n=1000-(10*n) energy units, where 0<n<t.

If, in this example, each reader requires x units of power per poll, where x is, for example, four (4), and if each reader requires y units per hour for all other reader functions, where y is, for example, two (2), server 106 may calculate the poll frequency to battery usage rate function (poll_freq_to_batt_usage_rate( )), wherein the poll_freq_to_batt_usage_rate( ) is equal to x units multiplied by poll frequency (poll_freq) per hour and added to y units per hour, i.e. poll_freq_to_batt_usage_rate( )4*poll_freq+2 units per hour, wherein the poll frequency may be set to a predefined default value. Server 106 may also calculate the battery usage rate to poll frequency function (batt_usage_rate_to_poll_freq( )) in polls per hour, wherein the batt_usage_rate_to_poll_freq( ) is equal to the difference of battery usage rate (batt_usage_rate) units per hour minus y units divided by x units, i.e. batt_usage_rate_to_poll_freq( )=(batt_usage_rate=2)/4 polls per hour.

The poll frequency may start at the predefined default value and may be subsequently calculated using a calculated poll frequency function (calc_poll_frequency( )), wherein the calc_poll_frequency( ) in polls per hour is equal to an old poll frequency (old_poll_frequency) polls per hour multiplied by a measured volatility (measured_volatility) percent per poll divided by a target volatility (target_volatility) percent per poll, i.e. calc_poll_frequency( ) in polls per hour=old_poll_frequency polls per hour*measured_volatility percent per poll/target_volatility percent per poll.

In determining poll frequencies at specific locations within the establishment, for example, at a department level, when a poll frequency reevaluation timer (pfrt) is set to expire, for each department containing readers, server 106 may obtain the number of tags added to the department after the information for the last poll was obtained from another system in the broader inventory management system, for example the point of sales system; server 106 may obtain the number of tags removed from the department after the information for the last poll was obtained from an inventory module in the automated inventory tracking system; and server 106 may obtain the number of tags moved within the department after the information for the last poll was obtained from a location module in the automated inventory tracking system.

In an example, in a department selling household items, wherein the department includes 1000 tagged items, the server may determine that a poll frequency reevaluation timer (pfrt), which is equal to 1 hour has expired. If server 106 determines that the readers in this department have used 50 hours of battery power and the battery in each reader contains 504 units of energy, server 106 may use the data obtained from other systems in the inventory management system and data obtained from the automated inventory tracking system, including data obtained from the inventory module and the location module in the automated inventory tracking system, to determine that since the last pfrt expiration, 30 tagged items were moved within the department, 7 tagged items were added to the department, and 3 tagged items were removed from the department. Server 106 may be pre-provisioned with a target volatility of one percent per poll.

Using the information of the household department, server 106 may measure volatility within the household department to be equal to one hundred multiplied by the sum of the number of tags added to the department (# tags_added), the number of tags removed from the department (# tags_removed), and the number of tags moved within the department (# tags_moved), wherein the product is divided by the number of tags in the establishment (# tags in store), i.e. volatility=100*(# tags_added+# tags_removed+# tags_moved)/# tags in store=100*(7+3+30)/1000=4 percent per poll. Volatility could alternatively be calculated as an average over a window of several polls.

Server 106 may also calculate a new poll frequency as being new_poll_freq=calc_poll_frequency(old_poll_freq, volatility); a new rate of use as being new_rate_of use=poll_freq_to_batt_usage_rate(new_poll_frequency); a maximum rate of use as being max_rate_of use=(current_battery_level—tgt_battery_lvl(current hour+pfrt))/pfrt; and a maximum poll frequency as being, max_poll_frequency=batt_usage_rate_to_poll_frequency (max_rate_of use). In an embodiment, if the new poll frequency is less than or equal to the maximum poll frequency, server 106 may send the new poll frequency to all readers in the department; otherwise, server 106 may send the maximum poll frequency to all readers in department.

Continuing with the household department example, if the previous poll frequency is 1 poll per hour, server 106 may also calculate a new poll frequency, new_poll_freq=1*4/1=4 polls per hour; new_rate_of use=4*4+2=18 energy units per hour; tgt_battery_level at hour 51=1000-10*51=490 energy units; max_rate_of use=(504-490)/1=14 energy units per hour; max_poll_frequency=(14-2)/4=3 polls per hour. In this example, because the new poll frequency is greater than the maximum poll frequency, the readers will be instructed to poll at maximum poll frequency or a rate of 3 polls per hour.

Server 104 may also use the battery level prediction and usage limiting logic described above to optimize and place limits on other poll attributes, such as interrogation length (i.e. the length of time readers wait for tag responses) and transmit power which also use varying amounts of battery power when adjusted. As above, periodically calculated optimal adjustments may be limited, if necessary, by the current battery level with respect to a current or future target level. A difference arises due to the fact that increases in interrogation length and transmit power are primarily driven by a desire to energize and then collect responses from additional tags during a single poll (as opposed to obtaining more frequent poll results). Therefore, adjustments to these parameters may be calculated on information other than volatility, for example, adjustments to these parameters may be calculated based on a target set of tags to energize. The target set could be all or a subset of the tags the reader is capable of energizing at a given time if it uses its full power and maximum interrogation length.

Whatever tags the target set of tags to energize contains, the minimum interrogation length and transmit power necessary to energize these tags may be unknown and may vary over time. However, the system may periodically estimate these values. For example, this can be accomplished by performing a series of test polls starting with a longer interrogation length and high transmit power and backing down on one or both parameters over successive polls to find the minimum values required to energize the target set of tags.

The target set of tags to energize may be significantly less than maximum set of tags a reader is capable of energizing due to the fact that accurate inventory tracking may not require all readers that could possibly read a tag to do so. When a tag is potentially covered by more than one reader, it is possible to reduce the transmit power level or interrogation length of one or more of those readers so that they see the tag less frequently (or not at all). Before taking such an action, the system may first evaluate whether it might also result in the loss of coverage of a significant proportion of other tags which cannot be covered by another reader. This can be done by first executing the test poll procedures as described above on all readers. The server may then evaluate the results for each tag individually to determine per-reader which parameter settings form the boundary between seeing or not seeing the tag. Multiple iterations of this process could produce an optimal distribution of power and/or interrogation lengths across all readers so that most tags are covered by as few readers as necessary and minimum overall battery power is required.

In some embodiments, each reader 104 may incorporate volatility measurements associated with tagged items and battery utilization data into periodic calculations to determine optimal polling parameters. It should be noted that periodic calculations may be performed during fixed or variable intervals. The periodic calculations performed by each reader 104 are used in adjusting the polling of the reader 104 until the next calculation. In one embodiment, each reader 104 may obtain input from another system/component of the broader inventory management system, input from one or more components of the automated inventory tracking system and input from information obtained from tags within the reader's coverage area over a period of time to gauge volatility. Reader 104 may use the automated inventory tracking system input and the input from information obtained from tags within its coverage area to make periodic estimations of presence and locations of items and to manage and adjust its polling based on the periodic estimations of presence and locations of items.

Figure 4:
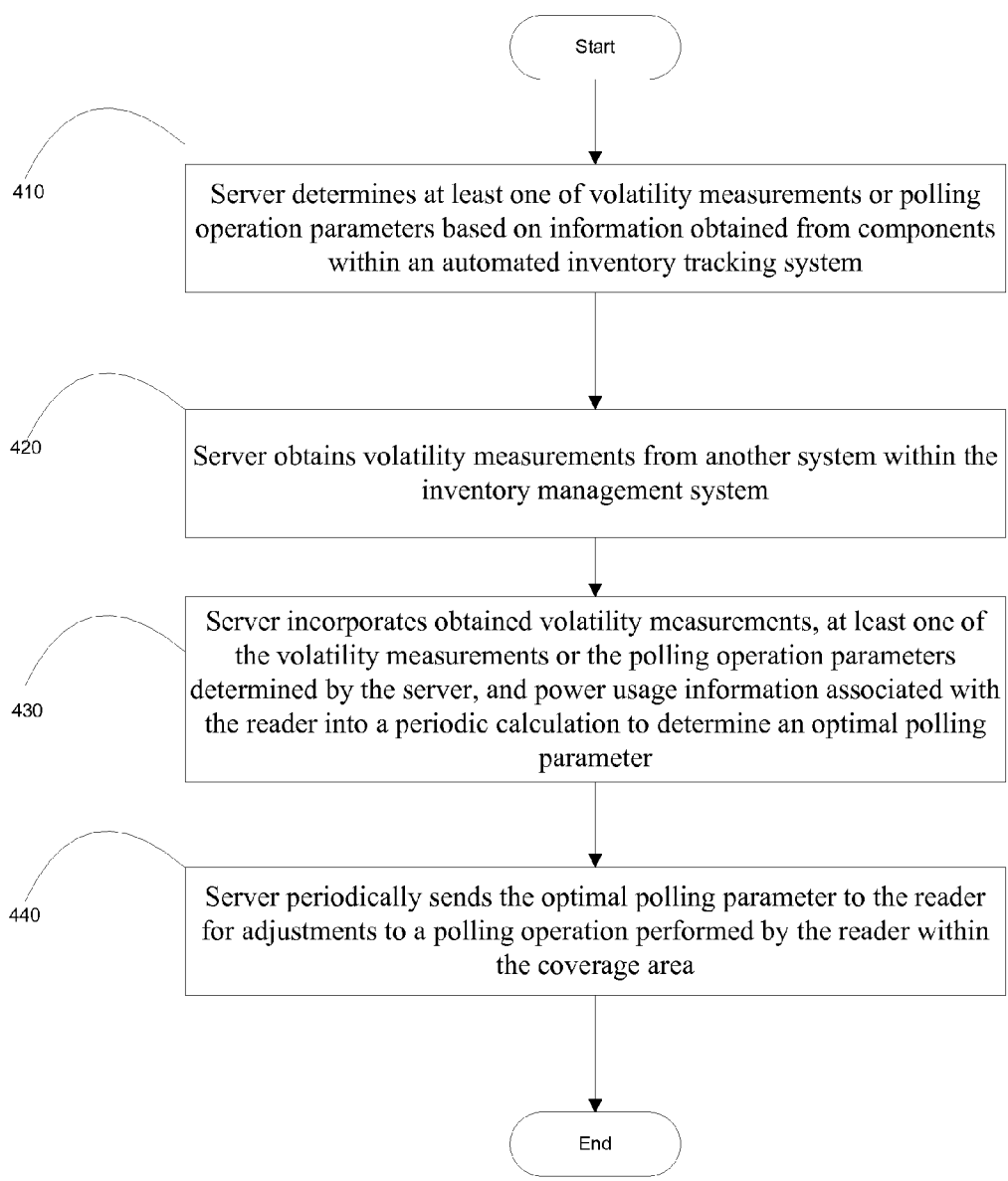
FIG. 4 is a flow diagram of a method of adjusting the attributes of polling operations performed by a reader within a coverage area in accordance with some embodiments.

FIG. 4 is a flow diagram of a method of adjusting polling parameters used by a reader in accordance with some embodiments. The adjustments are based on volatility measurements associated with tagged items within a predefined location to optimize usage of power by the reader. In 410, the server determines at least one of volatility measurements or polling operation parameters based on information obtained from components within an automated inventory tracking system, wherein the automated inventory tracking system is part of an inventory management system. In 420, the server obtains volatility measurements from another system within the inventory management system. In 430, the server incorporates obtained volatility measurements, at least one of the volatility measurements or the polling operation parameters determined by the server, and power usage information associated with the reader into a periodic calculation to determine an optimal polling parameter. In 440, the server periodically sends the optimal polling parameter to the reader for adjustments to a polling operation performed by the reader within the coverage area.

Figure 5:
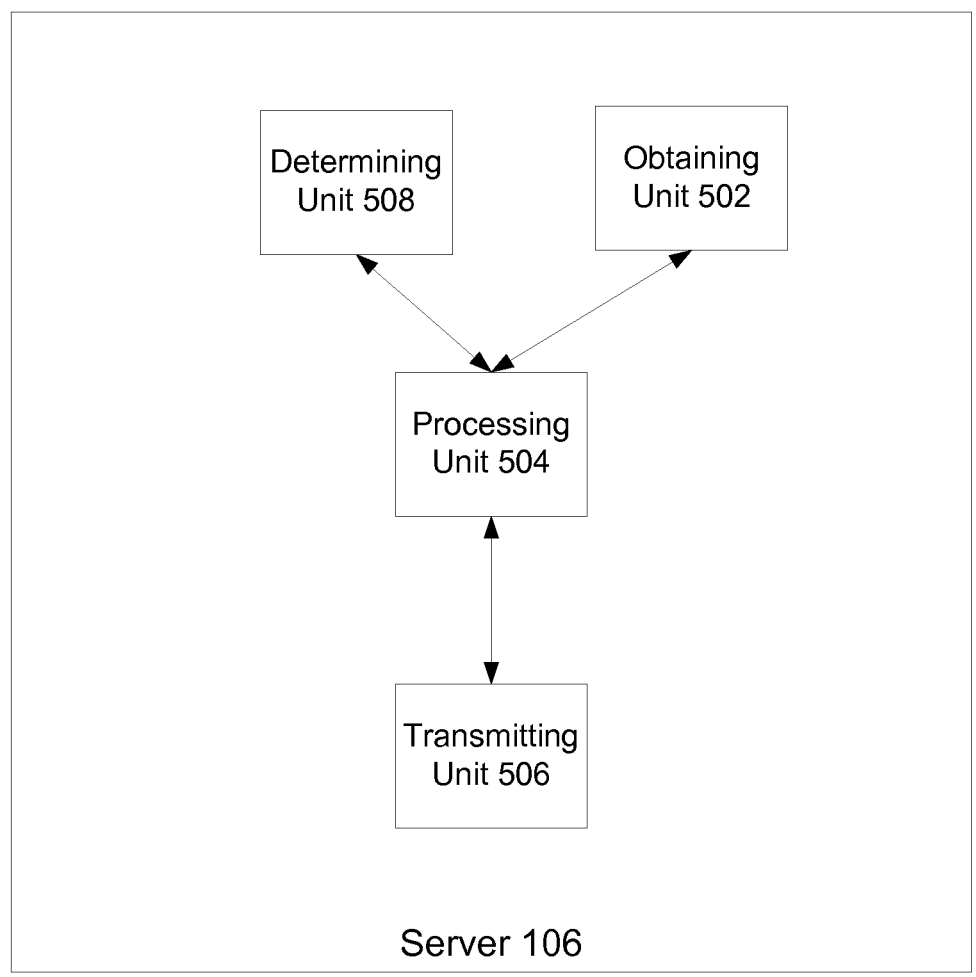
FIG. 5 is a block diagram of a server used in accordance with some embodiments.

FIG. 5 is a block diagram of a server used in accordance with some embodiments. Server 106 is configured to adjust polling operations performed by a reader within a coverage area to optimize usage of power by the reader. Server 106 includes a determining unit 508 configured to determine at least one of volatility measurements or polling operation parameters based on information obtained from components within an automated inventory tracking system. The automated inventory tracking system is part of an inventory management system. The server also includes an obtaining unit 502 configured to obtain volatility measurements from another system within the inventory management system. Server 106 also includes a processing unit 504 configured to incorporate the volatility measurements obtained from the other system, at least one of the polling operation parameters and the volatility measurements determined by the server, and power usage information associated with the reader into a periodic calculation to determine an optimal polling parameter. Server 106 also includes a transmitting unit 506 configured to periodically send the optimal polling parameter to the reader for adjustments to a polling operation performed by the reader within a coverage area. It should be noted that functions of the determining unit 508, obtaining unit 502, transmitting unit 506 may be performed by one or more processors in server 106.

Figure 6:
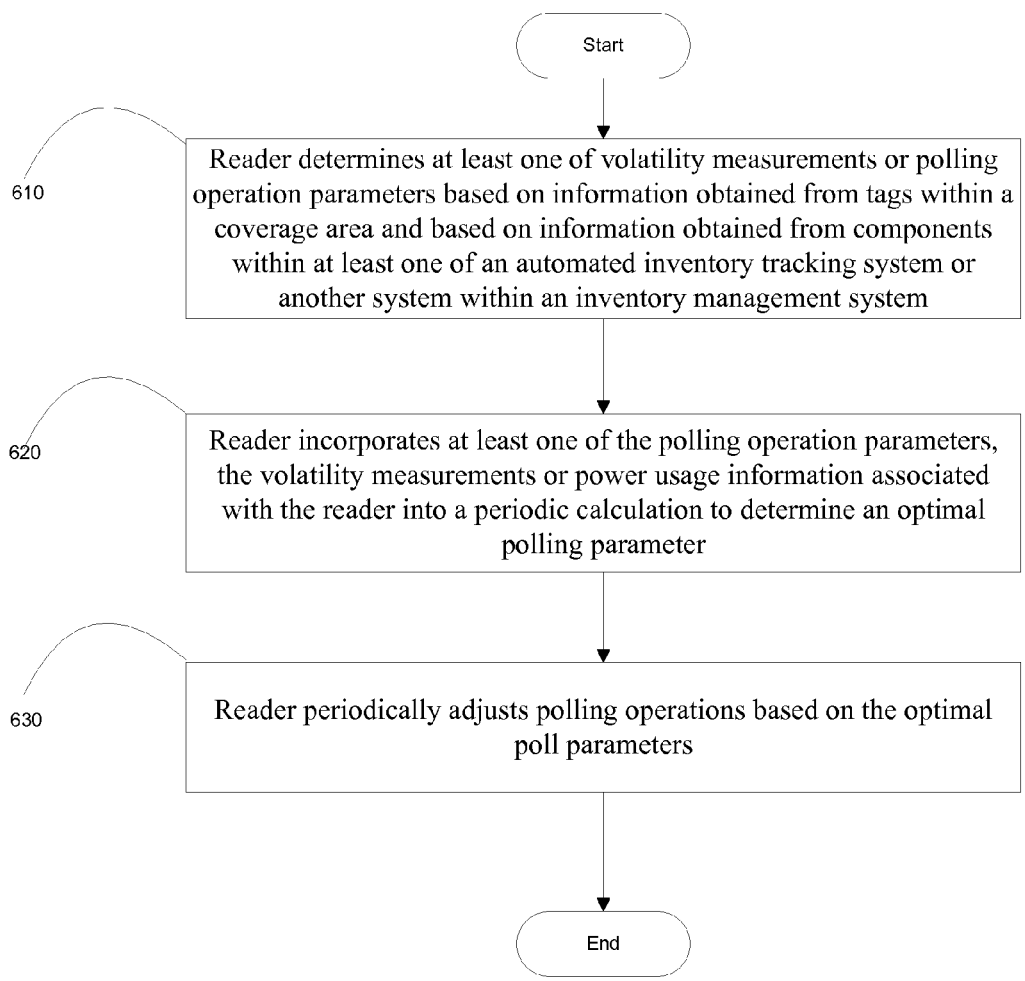
FIG. 6 is a flow diagram of a method used by a reader used in accordance with some embodiments.

FIG. 6 is a flow diagram of a method used by a reader in accordance with some embodiments. The reader includes the components noted above in FIG. 2. The reader is configured to perform polling operations and to adjust the polling operations based on at least one of volatility measurements or polling operation parameters. In 610, the reader determines at least one of volatility measurements or polling operation parameters based on information obtained from tags within a coverage area and based on information obtained from components within at least one of an automated inventory tracking system or another system within an inventory management system. The automated inventory tracking system is part of an inventory management system. In 620, the reader incorporates at least one of the polling operation parameters, the volatility measurements or power usage information associated with the reader into a periodic calculation to determine an optimal polling parameter. In 630, the reader periodically adjusts a polling operation based on the optimal poll parameter.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g. comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of adjusting polling operations performed by a reader, the method comprising:

determining, by a server, first volatility measurements based on information obtained from components within an automated inventory tracking system, wherein the automated inventory tracking system is part of an inventory management system, and wherein the volatility measurements are obtained based on changes detected by multiple readers reading a tagged item;

obtaining, by the server, second volatility measurements from a point of sale system within the inventory management system used for monitoring which items were sold;

determining, by the server, an optimal polling parameter based on the first and the second volatility measurements; and periodically sending, by the server, the optimal polling parameter to the reader for adjustment to a polling operation performed by the reader within a coverage area.

2. The method of claim 1, wherein the first volatility measurements include location volatility measurements associated with movements of tagged items being tracked within a location, including measurements associated with introduction of the tagged items into the location, removal of the tagged items from the location, changes in locations of the tagged items or changes in orientations of the tagged items in the location.

3. The method of claim 1, wherein the determining the first volatility measurements based on information obtained from components within the automated inventory tracking system comprises determining volatility measurements over a period of time and making periodic estimations of presence and locations of tagged items, and wherein the periodically sending comprises sending the periodic estimations to the reader for adjustment to the polling operation performed by the reader within the coverage area.

4. The method of claim 1, further comprising placing an upper limit on the polling operation performed by the reader within the coverage area, wherein if the optimal polling parameter is greater than the upper limit, the reader performs the polling operation at the upper limit, otherwise the reader performs the polling operation at the optimal polling parameter.

5. The method of claim 1, further comprising setting a target power level, wherein a frequency of the polling operation can be increased such that a power usage level remains at or below the target power level.

6. The method of claim 1, wherein the first volatility measurements from components within the automated inventory tracking system include a periodic battery power level report from the reader for comparison with a current power level or a future power level associated with the reader.

7. The method of claim 1, further comprising periodically setting, by the server, upper limits on predefined poll attributes for adjustments in a number of antennas used by the reader, an interrogation length and a transmit power used by at least one antenna on the reader to energize and collect responses from tags during a single poll.

8. The method of claim 1 wherein the optimal poling parameter is additionally based on power usage information associated with the reader.

9. A server configured to adjust polling operations performed by a reader, the server comprising:
   a determining unit configured to determine first volatility measurements based on information obtained from components within an automated inventory tracking system, wherein the automated inventory tracking system is part of an inventory management system, and wherein the volatility measurements are obtained based on changes detected by multiple readers reading a tagged item;
   an obtaining unit configured to obtain second volatility measurements from a point of sale system within the inventory management system used for monitoring which items were sold;
   a processing unit configured to determine a optimal polling parameter based on the first and the second volatility measurements;
   a transmitting unit configured to periodically send the optimal polling parameter to the reader for adjustments to a polling operation performed by the reader within a coverage area.

10. The server of claim 9, wherein the first volatility measurements include location volatility measurements associated with movements of tagged items being tracked within a location, including measurements associated with introduction of the tagged items into the location, removal of the tagged items from the location, changes in locations of the tagged items or changes in orientations of the tagged items in the location.

11. The server of claim 9, wherein the determining unit is configured to determine the first volatility measurements based on information obtained over a period of time and the processing unit is configured to make periodic estimations of presence and locations of tagged items, and
   wherein the transmitting unit is configured to send the periodic estimations to the reader for adjustments to the polling operation performed by the reader within the coverage area.

12. The server of claim 9, wherein the processing unit is configured to place an upper limit on the polling operation performed by the reader within the coverage area, wherein if the optimal polling parameter is greater than the upper limit, the reader performs the polling operation at the upper limit, otherwise the reader performs the polling operation at the optimal poll parameter.

13. The server of claim 12, wherein the processing unit is configured to allow the reader to temporarily perform the polling operation above the upper limit if the reader is performing the polling operation a rate that is less than the upper limit.

14. The server of claim 9, wherein the processing unit is configured to set a target battery power level, wherein the attributes of the polling operation can be configured such that a power usage level at the reader remains at or below the target battery power level.

15. The server of claim 9, wherein the obtaining unit is configured to obtain a periodic power level report from the reader for comparison with a current power level or a future power level associated with the reader.

16. The server of claim 9, wherein the transmitting unit is configured to periodically set upper limits on predefined poll attributes for adjustment in an interrogation length and a transmit power used by the reader to energize and collect responses from tags during a single poll.

\* \* \* \* \*